INVENTOR
Floyd B. Parsons
BY
J. William Carson
ATTORNEY

United States Patent Office 2,926,937
Patented Mar. 1, 1960

2,926,937
FLUID TIGHT JOINT

Floyd B. Parsons, Ridgewood, N.J., assignor to Specialties Development Corporation, Belleville, N.J., a corporation of New Jersey Application July 5, 1955, Serial No. 519,972

7 Claims. (Cl. 285—350)

The present invention relates to fluid tight joints for confining fluids under pressure, and, more particularly, to such joints which are subjected to fluctuating pressure and temperature extremes ranging from atmospheric to about 5000 pounds per square inch at temperatures between about —65° F. and 700° F.

Heretofore, considerable difficulty has been experienced in maintaining a satisfactory seal in the joints under the foregoing conditions. High temperature plastics have been tried as a substitute for conventional O-rings, but the chemical instability thereof when subjected to the high temperatures resulted in leaks. Asbestos-filled copper gaskets have been tried in direct compression between flat, machined surfaces; however, owing to manufacturing inconsistencies, such gaskets could not be confined within an enclosed recess as required for high pressure application. Hollow stainless steel O-rings have been tried; but thermal expansion and contraction thereof in temperature cycling impaired the seal.

Accordingly, an object of the present invention is to provide a fluid tight joint which is not subject to the foregoing disadvantages.

Another object is to provide such a fluid tight joint which can be applied to valves, fittings, plugs, closures, piping and other components for confining fluids in a simple, practical and economical manner.

Another object is to provide a fluid tight joint which can be taken apart and assembled repeatedly without the replacement of expensive parts, or the use of a special tool.

Other and further objects of the invention will be obvious upon an understanding of the illustrative embodiment about to be described, or will be indicated in the appended claims, and various advantages not referred to herein will occur to one skilled in the art upon employment of the invention in practice.

Preferred embodiments of the invention have been chosen for purposes of illustration and description, and are shown in the accompanying drawing, forming a part of the specification, wherein.

Figure 1:
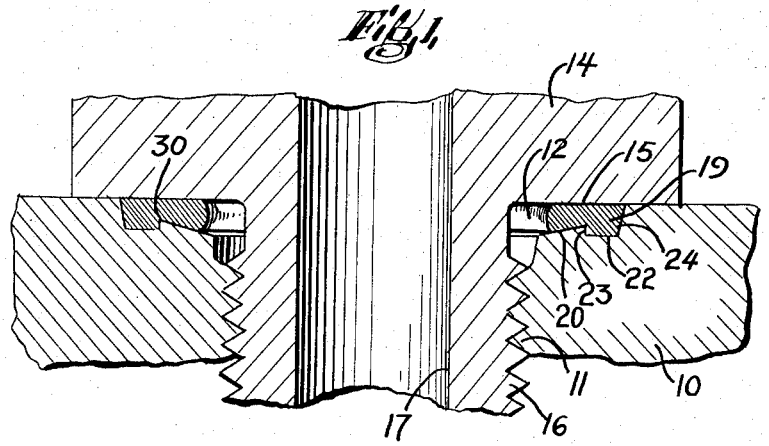
Fig. 1 is a fragmentary longitudinal sectional view of a fluid tight joint showing a pair of secured members provided with a seal in accordance with the present invention.

Referring to Fig. 1 in detail, there is shown a fluid tight joint generally comprising a member 10 having an internally threaded bore 11 and a recess 12, a member 14 having a flat annular surface 15, an externally threaded section 16 adapted for engagement with the bore 11, which may or may not, as desired, have a bore 17 to conduct fluid under pressure, and a gasket or washer 19 within the recess 12. The recess 12 of the member 10 is defined by an annular surface 20 adjacent the bore 11 and inclined from the horizontal at an angle of about 12°, and an annular groove or depression 22 bounded on its inner side by a wall 23 and at its outer periphery by a retainer wall 24.

Figure 2:
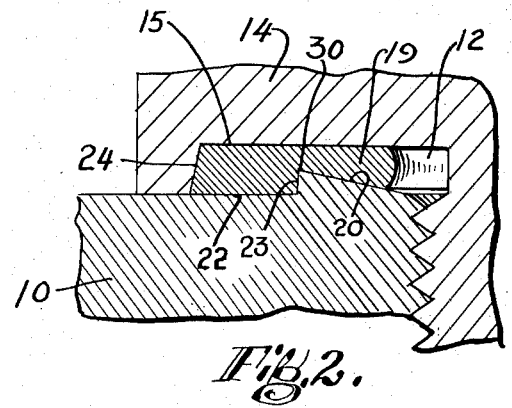
Fig. 2 is a fragmentary sectional view of another modification of the embodiment shown in Fig. 1.

The construction shown in Fig. 2 is similar to that of Fig. 1 excepting that the retainer wall 24 is on the member 14 and surrounds the annular surface 15.

Figure 3:
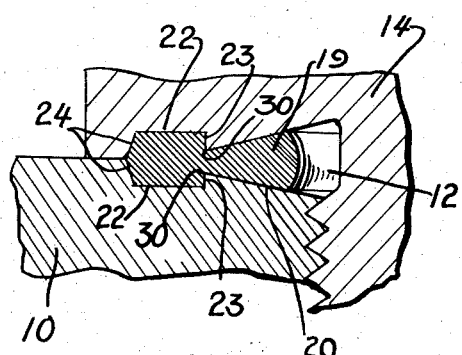
Fig. 3 is a fragmentary sectional view of still another modification of the embodiment shown in Fig. 1.

The construction shown in Fig. 3 is similar to that of Fig. 1 excepting that the members 10 and 14 have opposite identically contoured portions for receiving the gasket 19, including the surface 20, the recess 22, and the walls 23 and 24, and proportionately reduced in depth.

Figure 4:
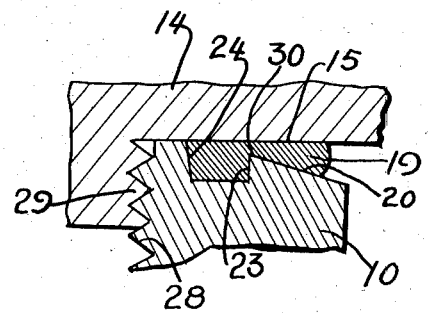
Fig. 4 is a fragmentary sectional view of a variation of the embodiment shown in Fig. 1 wherein the members are secured in another manner.

The construction shown in Fig. 4 is equivalent to that of Fig. 1 excepting that the member 10 has external threads 28 and the member 14 has internal threads 29.

The members 10 and 14 are constructed of a metallic material, for example, stainless steel, heat treated tool steel or naval brass, relatively hard with respect to the gasket 19. The gasket is constructed of annealed steel, soft aluminum or copper having adequate malleability for the required deformation and a greater coefficient of thermal expansion than the members 10 and 14.

Prior to being deformed as shown, the gasket is rectangular in cross-section. For example, when the diametrical distance between the walls 23 and 24 is about .043 inch, the height of the wall 23 is about .021 inch and the height of the wall 24 is about .062, the gasket has a width of about .078 inch and a thickness of about .062, the gasket thickness being equal to the height of the wall 24.

In making the seal, the gasket 19 is placed within the recess 12, and the members are threadedly engaged and tightened until contact is established by the members at the flat sides thereof by the surfaces 15 and 20. Upon further tightening of the members, the gasket is deformed by the upper end of the inclined annular surface (Figs. 1 to 4).

The uppermost annular zone 30 of these surfaces retains the gasket tightly so that during temperature cycling it acts as a fixed point from which expansion and contraction commences. In increasing ambient temperatures, the gasket 19 will attempt to expand proportionately in both width and thickness. Since the coefficient of thermal expansion of the gasket is greater than that of the members 10 and 14, the inner annular portion of the gasket, as the ambient temperature increases, moves inwardly down the incline 20 to occupy a larger volume to provide relief from permanent deformation. Similarly, in decreasing temperature cycling, the seal is maintained by compensating vertical contraction with proportionate contraction up the incline to provide a wedging action.

In view of the foregoing description, it will be seen that the present invention provides a novel and effective fluid tight joint adapted to withstand extreme operating and climatic temperatures and varying internal pressures.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A fluid tight joint for applications wherein the temperature of the joint varies through a wide range comprising a pair of members formed of hard metal and attached to each other, one of said members having a vertical bore therein provided with screw threads and the other of said members being externally threaded and engaging said threads in said bore, said members being provided with facing surfaces including outer flat horizontal portions held substantially in contact with each other by the securement of said members with said interengaging threads, said facing surfaces being formed to provide an annular gasket receiving recess therebetween positioned radially inwardly from said contacting outer surface portions and having an outer wall sloping inwardly slightly from the plane of said outer surface portions, at least one of said facing surfaces being formed with an annular shoulder of triangular cross-section projecting into said recess dividing said recess into an outer groove and an inner groove and providing said recess with an annular zone of decreased thickness, said shoulder being defined by a substantially vertical wall spaced inwardly of said outer wall of said recess and an annular inclined surface sloping inwardly from the top of said vertical wall at an angle of about twelve degrees with respect to the horizontal, said facing surfaces being formed with facing horizontal flat annular areas between said outer wall of said recess and said vertical wall of said shoulder, said zone of decreased thickness of said recess having a thickness equal to about two thirds the distance between said facing horizontal annular areas, said interengaging threads extending substantially to the plane of said recess; and a gasket disposed within said recess with its outer periphery abutting said outer recess wall, said gasket having the physical properties of soft aluminum and having a temperature coefficient of expansion greater than that of said members, said gasket having an initial thickness substantially equal to the distance between said facing horizontal annular areas and having an initial outer diameter substantially equal to the outer diameter of said recess and having an initial inner diameter less than the inner diameter of said inclined surface, said gasket being deformed by said shoulder to completely fill said outer groove and partially fill said inner groove to establish a seal and permit said gasket to expand into said inner groove in response to a rise in temperature.

2. A fluid tight joint according to claim 1, wherein one of said facing surfaces is flat throughout.

3. A fluid tight joint according to claim 2, wherein said member other than said member having the facing surface which is flat throughout is formed to provide said recess and has said shoulder.

4. A fluid tight joint according to claim 2, wherein said externally threaded member has a bore for conducting fluid under pressure.

5. A fluid tight joint according to claim 2, wherein said member having the facing surface which is flat throughout is formed to provide said recess and said other member has said shoulder.

6. A fluid tight joint according to claim 2, wherein said member having the bore provided with screw threads has the facing surface which is flat throughout.

7. A fluid tight joint according to claim 1, wherein both of said members have identical portions formed to provide said recess and have said shoulder.

References Cited in the file of this patent

UNITED STATES PATENTS

| | | |
|---|---|---|
| 683,485 | Osbourn | Oct. 1, 1905 |
| 812,642 | Crombie | Feb. 13, 1906 |
| 1,274,988 | Chadwick | Aug. 6, 1918 |
| 1,595,310 | Mueller | Aug. 10, 1926 |
| 1,715,854 | McKenzie-Martyn | June 4, 1929 |
| 1,819,036 | Oberhuber | Aug. 18, 1931 |
| 1,840,528 | Rabezzana | Jan. 12, 1932 |
| 1,896,795 | Kendall | Feb. 7, 1933 |
| 2,330,864 | Bruno | Oct. 5, 1943 |
| 2,537,249 | Walton | Jan. 9, 1951 |
| 2,553,222 | Wallgren et al. | May 15, 1951 |
| 2,695,184 | Hobbs | Nov. 23, 1954 |
| 2,780,483 | Kessler | Feb. 5, 1957 |

FOREIGN PATENTS

| | | |
|---|---|---|
| 351,015 | Great Britain | June 19, 1931 |